(12) United States Patent
Tan et al.

(10) Patent No.: US 8,539,593 B2
(45) Date of Patent: Sep. 17, 2013

(54) EXTRACTION OF CODE LEVEL SECURITY SPECIFICATION

(75) Inventors: Lin Tan, Champaign, IL (US); Xiaolan Zhang, Tarrytown, NY (US); Yuanyuan Zhou, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/358,580

(22) Filed: Jan. 23, 2009

(65) Prior Publication Data

US 2010/0192194 A1    Jul. 29, 2010

(51) Int. Cl.
*G06F 7/04* (2006.01)
*G06F 17/30* (2006.01)
*H04N 7/16* (2011.01)

(52) U.S. Cl.
USPC ............................................ 726/26; 717/144

(58) Field of Classification Search
None
See application file for complete search history.

(56) References Cited

U.S. PATENT DOCUMENTS

| | | | |
|---|---|---|---|
| 7,849,509 B2 * | 12/2010 | Venkatapathy et al. | ........ 726/25 |
| 2006/0288226 A1 | 12/2006 | Kowal | |
| 2007/0094707 A1 | 4/2007 | Karch | |
| 2007/0150965 A1 | 6/2007 | Redlich | |
| 2007/0180490 A1 | 8/2007 | Renzi | |
| 2007/0226797 A1 | 9/2007 | Thompson | |

FOREIGN PATENT DOCUMENTS

| | | |
|---|---|---|
| CN | 1421770 A | 6/2003 |
| EP | 1624692 A1 | 2/2006 |

OTHER PUBLICATIONS

Ganapathy et al., "Mining Security Sensitive Operations in Legacy Code using Concept Analysis," May 2007, ICSE'07 29th International Conference on Software Engineering, pp. 1-12.*
Zhenmin, Li et al., "PR-MINER: Automatically Extracting Implicit Programming Rules and Detecting Violation in Large Software Code", ESEC/SIGSOFT FSE 2005: 306-315.
Lin Tan et al, "AutoISES: Automatically Inferring Security Specifications and Detecting Violation" USENIX Security Symposium 2008: 379-394.

* cited by examiner

*Primary Examiner* — Nadia Khoshnoodi
(74) *Attorney, Agent, or Firm* — Cantor Colburn LLP; Preston Young

(57) ABSTRACT

A method comprising, receiving a source code, identifying a data structure access in the source code, determining whether the data structure access is associated with a security check function, defining the data structure access as a security sensitive operation responsive to determining that the data structure access is associated with the security check function, and defining a security specification to include the security check function and the security sensitive operation.

14 Claims, 5 Drawing Sheets

Security Check Function: security_file_permission
Security Sensitive Operation (A group of data structure accesses):
1. READ inode->i_size
2. READ file->f_flags
3. READ file->f_pos
4. READ file->f_dentry
5. READ file->f_dentry->d_inode
6. READ file->f_vfsmnt
7. READ dentry->d_inode
8. READ address_space->flags
9. READ address_space->nrpages
10. WRITE address_space->nrpages
11. READ address_space->page_tree
12. READ address_space->tree_lock
13. READ page->_count
14. READ page->flags
15. WRITE page->index
16. READ page->mapping
17. WRITE page->mapping
18. READ pglist_data->node_zonelists
19. READ zone->wait_table
20. READ zone->wait_table_bits
21. READ (Global) nr_pagecache
22. READ (Global) zone_table

FIG. 2

EXTRACTION OF CODE LEVEL SECURITY SPECIFICATION

BACKGROUND

The embodiments relate generally to software security and more particularly to extracting code level security specification from source code.

Software often uses code level security routines to secure sensitive data on a system. When a source code is written, a code developer may identify particular data that is sensitive and restrict access to the data from unauthorized users or processing entities using an access control scheme. For example, an access control scheme may include a number of security check functions that, when called, determine whether a subject (i.e., a process entity) is authorized to perform a particular operation (e.g., read or write) on an object (e.g., a data file, an inode, or a socket). An operation on a sensitive object is called a security sensitive operation. Identified security sensitive operations and the security check functions associated with each object are used to define a security specification for a code.

Typically, a code developer identifies sensitive objects and associates security check functions with the sensitive objects when developing the code. When writing the code, the developer inserts a security check function (or a call to a security check function) each time a security sensitive operation path occurs in the code. For example, when a read or write instruction path for a sensitive object occurs in the code (a security sensitive operation), a security check function is inserted into the code. When the security sensitive operation occurs, the security check function is run to determine whether the entity requesting the security sensitive operation is authorized to perform the operation. The security check function authorizes or denies the performance of the operation.

Once code is written the code is reviewed to ensure the security specification are followed and that all security sensitive operations include the performance of a security check function prior to performing each security sensitive operation.

SUMMARY

The shortcomings of the prior art are overcome and additional advantages are achieved through an exemplary method, comprising, receiving a source code, identifying a data structure access in the source code, determining whether the data structure access is associated with a security check function, defining the data structure access as a security sensitive operation responsive to determining that the data structure access is associated with the security check function, and defining a security specification to include the security check function and the security sensitive operation.

An exemplary system comprising a processor operative to receive a source code, identify a data structure access in the source code, determine whether the data structure access is associated with a security check function, define the data structure access as a security sensitive operation responsive to determining that the data structure access is associated with the security check function, and define a security specification to include the security check function and the security sensitive operation.

An exemplary computer readable medium including instruction to receive a source code, identify a data structure access in the source code, determine whether the data structure access is associated with a security check function, define the data structure access as a security sensitive operation responsive to determining that the data structure access is associated with the security check function, and define a security specification to include the security check function and the security sensitive operation.

BRIEF DESCRIPTION OF THE SEVERAL VIEWS OF THE DRAWINGS

FIG. 2 illustrates an example of a security specification.

DETAILED DESCRIPTION

Figure 1:
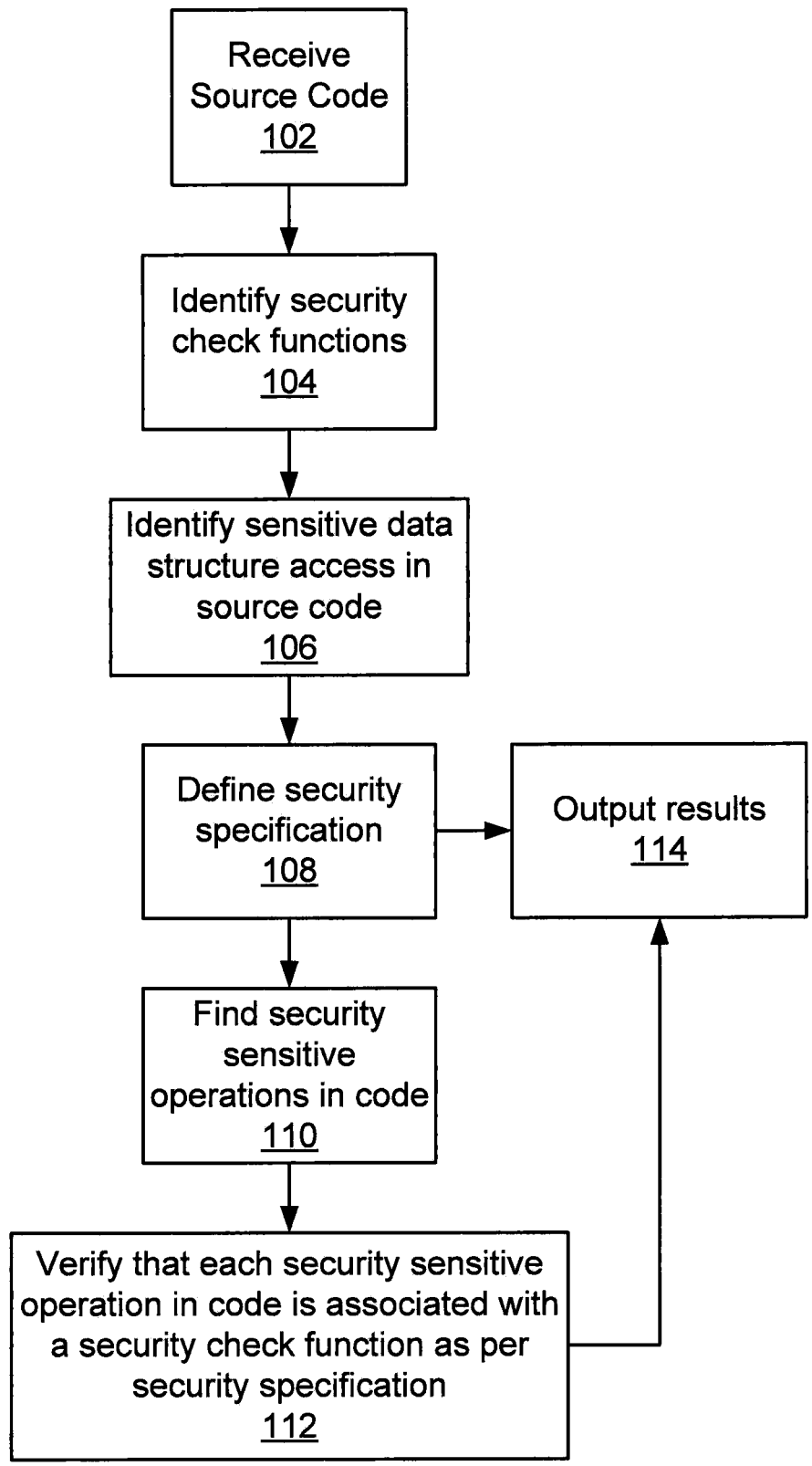
FIG. 1 illustrates a block diagram of a high level method for reviewing source code.

FIG. 1 illustrates a block diagram of a high level method for reviewing source code to determine whether every security sensitive operation is associated with a security check function. In block 102, the source code is received. In block 104, the security check functions used in the code are identified. The security check functions are usually annotated in header information in the code and are labeled with identifiers (e.g., security_file_mmap (<file>, . . . )). The reviewer may then identify the sensitive operations in the code by reviewing the body of the code to find security check functions (or calls to security check functions) and determining what object is associated with each security check function and identifying the data structure access in block 106. An object typically resides in a particular field of a data structure. An object associated with a security check function may be defined as a sensitive object. In block 108, the security specification is defined. A security specification includes a security check function and each of the security sensitive operations (data structure accesses, i.e., a read or write function associated with a sensitive object) that, when requested, should call and run the security check function. When the security specification is defined, the code may be reviewed to find each security sensitive operation listed in the security specification in block 110. When a security sensitive operation is found in the code, the code is verified to determine whether the code includes the running of a security check function prior to performing the security sensitive operation in block 112. The results including the security specification may be output to a user for analysis in block 114.

Though finding security sensitive operations and verifying that each security sensitive operation is associated with a security check function may be performed automatically and efficiently, defining the security specification has previously been performed manually, and is prone to human error due to the complexity of the task. The difficulty of developing an accurate security specification manually is increased as the code is updated or revised because new specification has to be generated that matches the new version of code. An efficient and accurate method for defining a security specification is desired.

FIG. 2 illustrates an example of a security specification 200. The security specification 200 includes a security check function and the associated security sensitive operation defined as a numbered list of data structure accesses (e.g., "READ" instruction; and the data structure and field, "inode->i_size").

Figure 3:
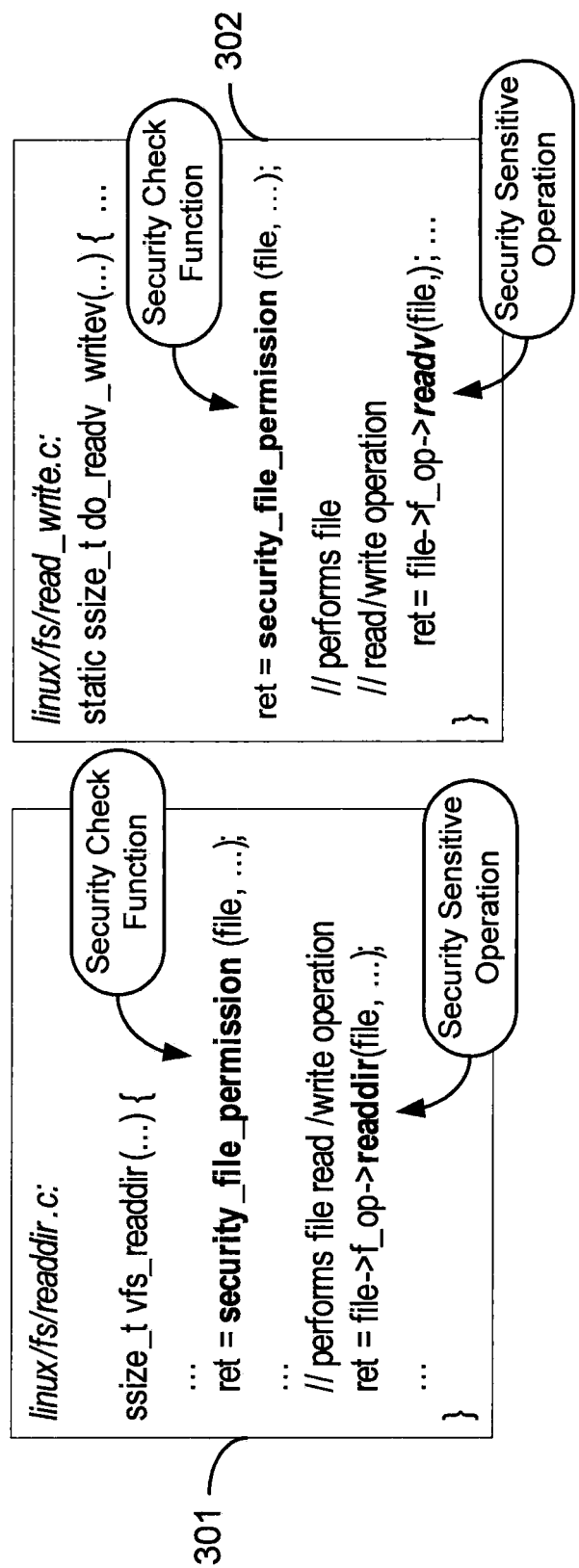
FIG. 3 illustrates example portions of code.

FIG. 3 illustrates two example portions of code that will be used to illustrate a typical method for defining a security specification. In block 301, a security check is shown that is called and run when the shown security sensitive operation is requested. When a reviewer performs block 106 (of FIG. 1), the known security check function is found in the code, and the security sensitive operation may be identified. Once the security sensitive operation is identified, the sensitive object associated with the security sensitive operation (data structure access) may be identified; associated with the security check function; and added to the security specification (in block 108). The security sensitive operation of block 302 is different than the security sensitive operation of block 301. If the security sensitive operation of block 302 is not associated with a security check function it may be easily missed by a reviewer.

Figure 4:
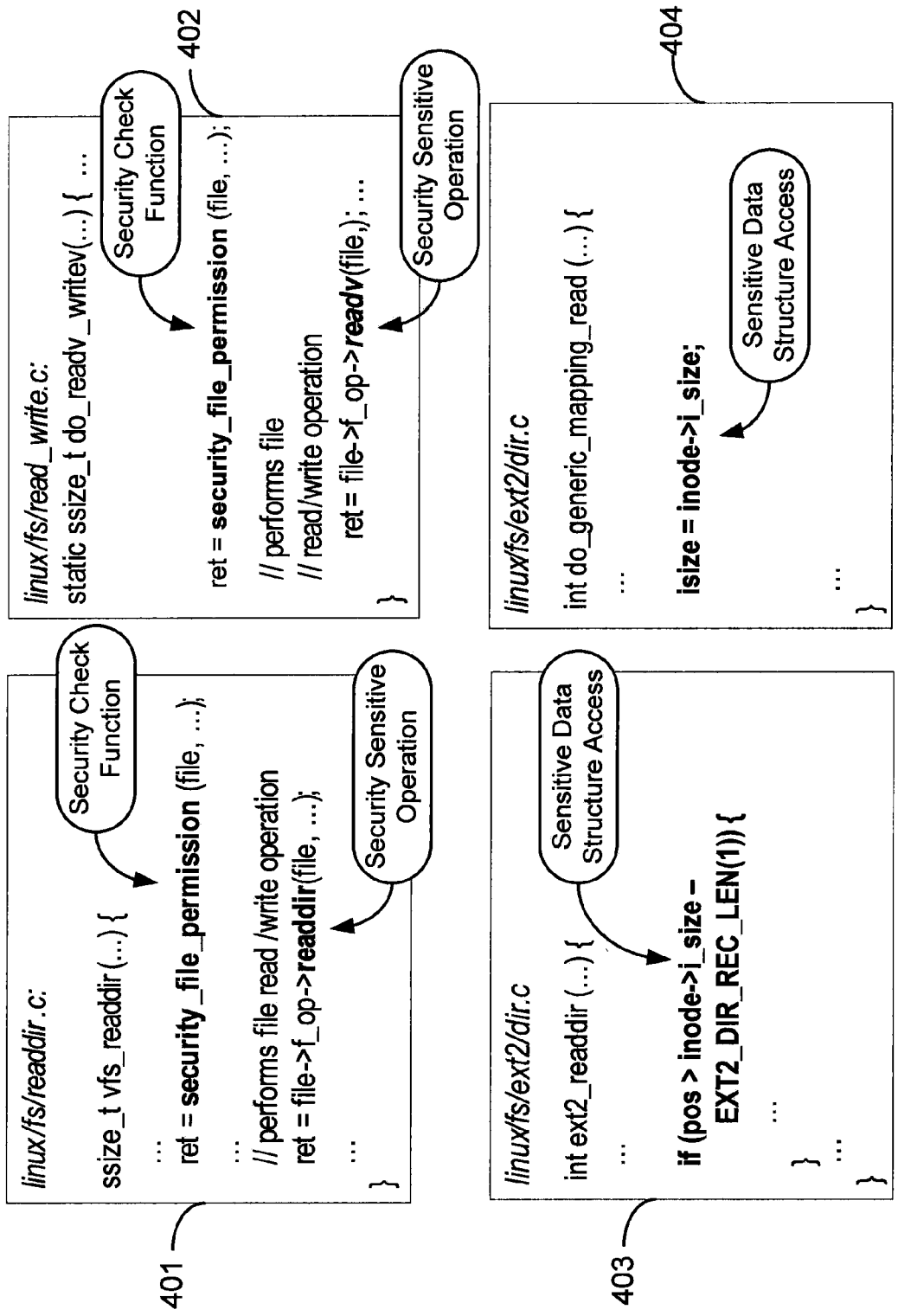
FIG. 4 illustrates example portions of code.

FIG. 4 illustrates two example portions of code. Blocks 401 and 402 show two security sensitive operations that are protected by a security check function. Identifying the security sensitive operations by their function names does not necessarily identify the sensitive data structure access that includes the sensitive data. Blocks 403 and 404 show the sensitive data structures that are called by the two security sensitive operations. The sensitive data structure access (security sensitive object) in block 404 includes the same data structure and field as the protected security sensitive object of block 403 (inode->i_ size). Though the function names of the security sensitive operations are different, the functions access the same data structures. Thus, using data structures accesses as opposed to function names to identify security sensitive operations is less error prone.

The security specification is used in block 110 (of FIG. 1) to find each security sensitive operation in the code and verify (in block 112) that the security check function associated with each found security sensitive operation in the security specification is run when each security sensitive operation is performed. An incomplete or inaccurate security specification results in a failure to identify security violations in the code because a correct security specification should include each security sensitive operation.

As shown in FIG. 4 above, defining a security specification by merely identifying occurrences of security check functions in code; using the identified security check functions to identify associated operations; defining the associated operations as security sensitive operations; and adding the security sensitive operations, is prone to error. Since instances of the same type of security sensitive operations access the same sensitive data structures, if the code is reviewed to identify the sensitive data structures associated with known instances of security sensitive operations, the identified sensitive data structures may then be used to identify unknown instances of security sensitive operations.

Figure 5:
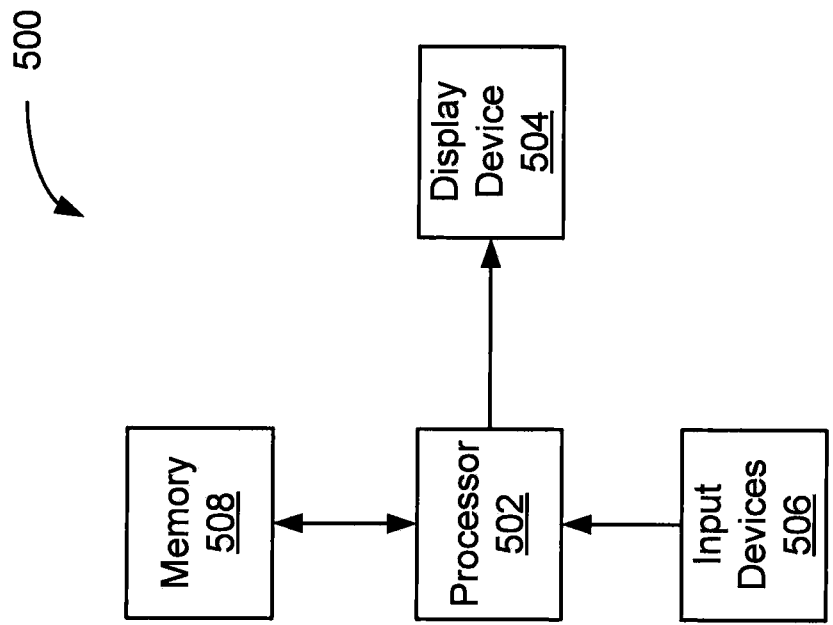
FIG. 5 illustrates an exemplary embodiment of a system for reviewing source code.

FIG. 5 illustrates an exemplary embodiment of a system for reviewing source code. The system 500 includes a processor 502 communicatively connected to a display device 504, input devices 506, and a memory 508. The memory 508 may include any computer readable medium, for example, an optical disk, a magnetic disk, and a solid state memory device. In operation the system may perform the methods described herein.

Details of an exemplary method for defining a security specification are described below. Given the target source code and a set of n security check functions, CheckSet={Check$_1$, ..., Check$_n$}, each of which can check if a subject (e.g., a process), is authorized to perform a certain security sensitive operation, Op$_i$ (e.g., read, where 1<i<n), on a particular object (e.g., a file) security specifications or security rules, Rule$_i$, are uncovered in the form of a pair, (Check$_i$, Op$_i$), indicating that a security sensitive operation Op$_i$, must be protected, $<_{protected}$, by security check function Check$_i$ each time Op$_i$ is performed. Protected is defined as the operation Op$_i$ can not be performed if the check Check$_i$ fails.

A security check function Check$_i$ may be called multiple times in the program, each of which is called an instance of the security check function, denoted as InstanceOf(Check$_i$)$_v$, where v is between 1 and the total number of Check$_i$ instances inclusive. Similarly, a security sensitive operation Op$_i$ may appear in the program multiples times, and each of which is called an instance of the sensitive operation, Instance Of(Op$_i$)$_u$. If for all instances of the sensitive operation, there exists at least one instance of security check function to protect the sensitive operation, then the sensitive operation is protected by the security check function. Formally defined:
$\forall$InstanceOf(Op$_i$)$_u$, $\exists$InstanceOf(Check$_i$)$_v$, such that Instance Of(Op$_i$)$_u <_{protected}$ InstanceOf(Check$_i$)$_v$ => Op$_i <_{protected}$ Check$_i$.

The data structure accesses is used to represent a security sensitive operation. Therefore, a set of unordered data structure accesses, AccessSet={Access$_1$, ..., Access$_m$}, represent sensitive operation Op, where each data structure access is defined as:
   Access$_i$:=READ AST|WRITE AST|ACCESS AST
   AST:=type_name(->field)*|global variable
Wherein, AST is an Abstract Syntax Tree.

Replacing the security sensitive operation Op$_i$ with AccessSet as defined above, gives the following definition of security rules:

$$Rule_i = (Check_i, AccessSet_i), \text{ where } Check_i \in CheckSet$$
$$=> AccessSet_i <_{protected} Check_i.$$

As such rules are usually undocumented, and are automatically inferred from source code by observing what sensitive operation is frequently protected by a security check function, i.e., what sensitive operations are commonly protected by different instances of the same security check function. The following inference rule infers security rules:

$$AccessSet_i <_{frequently\ protected} Check_i$$
$$=> InferredRule_i = (Check_i, AccessSet_i),$$
where $Check_i \in CheckSet$.

An instance of a security sensitive operation, InstanceOf (AccessSet$_i$)$_u$ is a violation to InferredRule$_i$ if it is not protected by any instance of the security check function. Defined below:

$$\text{Given } InferredRule_i = (Check_i, AccessSet_i),$$
$$\forall\ InstanceOf(Check_i)_v,$$
$$InstanceOf(AccessSet_i)_u \sim <_{protected} InstanceOf(Check_i)_v$$
$$=> InstanceOf(AccessSet_i)_u \in Violation_i.$$

The code is broken into modules (e.g., each file system is a module) based on the compilation configurations that come with the software (e.g. in Makefile), and the root functions of each module as functions that actually use security check functions for authorization check are determined, where root functions are functions that are not called by any other functions in the module. These root functions can be automatically extracted by analyzing the call graphs of each module.

Starting from the automatically identified root functions, the data structure access set may be extracted for each instance of a security check function. To obtain the data structure access set protected by the security check function, the intersection of all of the access sets is computed. Since the static analysis may miss some data structure accesses for some root functions due to analysis imprecision, accesses are not required to be protected by all instances. Instead, if intersecting an access set results in an empty set, the access set is dropped because it is likely to be an incomplete set. As long as there are enough security check instances protecting the accesses, the accesses are security sensitive and the inferred rule is assumed to be valid.

However, different from inferring general program rules, many security check functions are called only once or twice, which makes it difficult for the intersection strategy to be effective. It has been observed in Linux that many such functions are only called once or twice because Linux uses a centralized place to invoke such checks for different implementations. For example, check function security mode rmdir ( ) is only called once in the virtual file system level, but it actually protects the sensitive rmdir operation of many different file systems. Therefore, semantically the check function is invoked once for each file system. Thus, an intersect of the rmdir operations of different file systems may be used to obtain the essential protected sensitive accesses. This strategy makes it possible for the method to automatically generate rules of reasonably small sizes with high confidence even for check functions that are called only a few times. This is realized by performing a function alias analysis and generating a separate static trace for each function alias, essentially treating each function alias as if it was a separate function call.

Inter-procedural and flow-insensitive static program analysis is used to infer security rules and detect violations. Inter-procedural analysis is used because many sensitive data structure accesses related to the same sensitive operation are performed in different functions. The accesses can be many (e.g., 18) levels apart in the call chain, meaning the caller of one access can be the 18th ancestor caller of another access. An intra-procedural analysis would not adequately capture the security rules or be effective at detecting violations. Without the above described inter-procedural analysis, most of the violations may be undetectable. For higher accuracy, a full inter-procedural analysis is performed, which means that the analysis tool may zoom deeply into functions, i.e., until it has analyzed all reachable functions whose source code is available. Flow-insensitive analysis is preferred over flow-sensitive analysis because it is less expensive and scales better for large software.

As function pointers are widely used in Linux and Xen, and simple function pointer analysis is used by resolving a function pointer to functions with the same type. The analysis is conservative in the absence of type cast.

An untrusted-space exposability analysis may be used to limit false positive results. The analysis identifies security sensitive operations that are performed by the trusted computing base on its own behalf and exempts them from the requirement of being protected by the security check. In Linux, for example, defining the kernel to be a trusted computing base, security sensitive operations in kernel space that do not interact with the untrusted space (user space entity), do not need to be protected by a security check function because the kernel is trusted to perform any operations on its own behalf. On the other hand, if such sensitive operations interact with the untrusted space, e.g., are performed by a user space process via system calls, or use data copied from user space, then a security check may be mandatory. In other systems, for example, Xen the hypervisor is defined as the trusted computing base.

Since it is typical that a large number of sensitive operations are not exposed to the untrusted space, most of the detected violations would be false alarms, which is detrimental to a detection tool. To reduce such false positives, a trusted space exposability study is performed. A list of user space interface functions is compiled that are known a priori to be exposed to user space, e.g., system calls such as sys_read (). The sensitive operations that are reachable from these interface functions are identified. If a sensitive operation that can be exposed to the untrusted space is not protected by the proper security check function, we report the violation as an error; otherwise, we report the violation as a warning.

The technical effects and benefits of the above-described systems and methods provide a method and system for defining a security specification in source code; and verifying that the source code properly implements the security specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving with a processor a source code;
identifying with the processor a data structure access in the source code, wherein the data structure access (Access$_i$) is defined as AST:=type name(- >field)*| global variable; wherein, AST is an Abstract Syntax Tree;
determining whether the data structure access is associated with a security check function;
defining the data structure access as a security sensitive operation responsive to determining that the data structure access is associated with the security check function; and
defining a security specification to include the security check function and the security sensitive operation,
wherein the determining whether the data structure access is associated with a security check function is defined by the function: $\forall InstanceOf(Op_i)_u, \exists InstanceOf(Check_t)_v$, such that $InstanceOf(Op_i)_v <_{protected}$ Instanc Of(Check$_i$)$_v$=>Op$_i$<$_{protected}$ Check$_i$, wherein Op$_i$ is the security sensitive operation and Check$_n$ is the security check function.

2. The method of claim 1, wherein the security check function (Check$_n$) is operative to deny a requested data structure access to an unauthorized requestor.

3. The method of claim 1, wherein the method further comprises outputting the security specification to a display for analysis by a user.

4. The method of claim 1, wherein the method further comprises:
- identifying an instance of the security sensitive operation in the source code;
- determining whether the instance of the security sensitive operation is paired with the associated security check function; and
- outputting a notification identifying the instance of the security sensitive operation responsive to determining that the instance of the security sensitive operation is not paired with the associated security check function.

5. The method of claim 1, wherein the method further comprises:
- identifying an instance of the security sensitive operation in the source code;
- determining whether the instance of the security sensitive operation is paired with the associated security check function; and
- determining whether the instance of the security sensitive operation is performed by an untrusted entity;
- outputting a notification identifying the instance of the security sensitive operation responsive to determining that the instance of the security sensitive operation is not paired with the associated security check function and is performed by an untrusted entity.

6. A system comprising: a hardware processor operative to receive a source code, identify a data structure access in the source code, wherein the data structure access (Access$_i$) is defined as AST :=type name(->field) * | global variable; wherein, AST is an Abstract Syntax Tree, determine whether the data structure access is associated with a security check function, define the data structure access as a security sensitive operation responsive to determining that the data structure access is associated with the security check function, and define a security specification to include the security check function and the security sensitive operation,
- wherein the determining whether the data structure access is associated with a security check function is defined by the function: ∀InstanceOf(Op$_i$)$_u$, ∃InstanceOf(Check$_i$)$_v$, such that InstanceOf(Op$_i$)$_v$<$_{protected}$ InstanceOf(Check$_i$)$_v$=>Op$_i$<$_{protected}$ Check$_i$, wherein Op$_i$ is the security sensitive operation and Check$_n$ is the security check function.

7. The system of claim 6, wherein the security check function (Check$_n$) is operative to deny a requested data structure access to an unauthorized requestor.

8. The system of claim 6, wherein the method further comprises outputting the security specification to a display for analysis by a user.

9. The system of claim 6, wherein the hardware processor is further operative to identify an instance of the security sensitive operation in the source code, determine whether the instance of the security sensitive operation is paired with the associated security check function, and output a notification identifying the instance of the security sensitive operation responsive to determining that the instance of the security sensitive operation is not paired with the associated security check function.

10. The system of claim 6, wherein the hardware processor is further operative to identify an instance of the security sensitive operation in the source code, determine whether the instance of the security sensitive operation is paired with the associated security check function, and determine whether the instance of the security sensitive operation is performed by an untrusted entity, output a notification identifying the instance of the security sensitive operation responsive to determining that the instance of the security sensitive operation is not paired with the associated security check function and is performed by an untrusted entity.

11. A non-transitory computer readable medium including: instruction to receive a source code, identify a data structure access in the source code, wherein the data structure access (Access$_i$) is defined as AST:=type_name(->field)*| global variable; wherein, AST is an Abstract Syntax Tree, determine whether the data structure access is associated with a security check function, define the data structure access as a security sensitive operation responsive to determining that the data structure access is associated with the security check function, and define a security specification to include the security check function and the security sensitive operation,
- wherein the determining whether the data structure access is associated with a security check function is defined by the function: ∀InstanceOf(Op$_i$)$_u$, ∃InstanceOf(Check$_i$)$_v$, such that InstanceOf(Op$_i$)$_v$<$_{protected}$ InstanceOf(Check $_i$)$_v$=>Op$_i$<$_{protected}$ Check$_i$, wherein Op$_i$ is the security sensitive operation and Check$_n$ is the security check function.

12. The computer readable medium of claim 11, wherein the security check function (Check$_n$) is operative to deny a requested data structure access to an unauthorized requestor.

13. The computer readable medium of claim 11, wherein the instruction further comprises outputting the security specification to a display for analysis by a user.

14. The computer readable medium of claim 11, wherein the instruction further comprise, identify an instance of the security sensitive operation in the source code, determine whether the instance of the security sensitive operation is paired with the associated security check function, and output a notification identifying the instance of the security sensitive operation responsive to determining that the instance of the security sensitive operation is not paired with the associated security check function.

* * * * *